United States Patent [19]

Greenhalgh

[11] 4,198,463
[45] Apr. 15, 1980

[54] TOUGHENED GLASS SHEETS

[75] Inventor: Geoffrey Greenhalgh, Orrell, England

[73] Assignee: Triplex Safety Glass Company Limited, Birmingham, England

[21] Appl. No.: 916,559

[22] Filed: Jun. 19, 1978

[30] Foreign Application Priority Data

Jun. 23, 1977 [GB] United Kingdom ............... 26361/77

[51] Int. Cl.² ............................................. C08B 27/00
[52] U.S. Cl. ..................................... 428/332; 65/114; 65/115; 428/220; 428/410
[58] Field of Search ........................ 65/104, 114, 115; 428/220, 410, 332

[56] References Cited

U.S. PATENT DOCUMENTS

| | | | |
|---|---|---|---|
| 3,363,936 | 1/1968 | Baker | 65/115 X |
| 3,364,006 | 1/1968 | Newell et al. | 65/115 X |
| 3,672,861 | 6/1972 | Ritter, Jr. et al. | 65/114 X |
| 4,128,690 | 12/1978 | Boardman | 65/115 X |

FOREIGN PATENT DOCUMENTS

| | | | |
|---|---|---|---|
| 632694 | 11/1963 | Belgium | 65/115 |
| Ad.69580 | 7/1958 | France | 65/104 |

*Primary Examiner*—Arthur D. Kellogg
*Attorney, Agent, or Firm*—Burns, Doane, Swecker & Mathis

[57] ABSTRACT

Thermally toughened glass sheets of thickness 2.5 mm to 4.0 mm for use as motor vehicle side or rear windows, are produced by quenching producing an average central tensile stress in the range 62 MN/m² to 44.0 MN/n². At least one gas jet is directed at the glass sheet to augment toughening stresses and produce at least one strip-shaped region of more highly toughened glass. The central tensile stress in the strip-shaped region is in the range from 2 MN/m² to 5 MN/m² greater than the average central tensile stress in the glass sheet. There are major and minor principal stresses in the strip-shaped region acting in the plane of the glass sheet. The difference between the major and minor principal stresses is in the range 5 MN/m² to 25 MN/m².

5 Claims, 7 Drawing Figures

TOUGHENED GLASS SHEETS

BACKGROUND OF THE INVENTION

This invention relates to production of flat or curved sheets of thermally toughened glass, such as are used for example as motor vehicle side or rear windows.

In most countries there are official regulations specifying the fracture requirements for toughened glass sheets which are to be used as side or rear windows for motor vehicles.

Typically such regulations specify that the toughened glass sheets shall be fractured by localised impact at a defined position on the glass sheet, two particular positions being at the geometrical centre of the glass sheet and at a position adjacent the edge of the sheet. It is then required that areas of the fractured glass sheet should be selected where the particle count is a minimum and where the particle count is a maximum and limitations are placed on the minimum and maximum particle counts permissible in such areas. The minimum particle count permissible determines the maximum size of particles resulting from fracture so as to limit the danger of laceration by larger particles subsequent to fracture of the glass sheet in an accident. The maximum particle count permissible determines the minimum fineness of particles resulting from accidental fracture of the glass sheet so as to limit the danger of ingestion of fine glass particles. At present motor vehicle side and rear windows are made from glass of about 4.0 mm to 6.0 mm thickness and can be uniformly toughened so as to meet official fracture requirements.

For example glass sheets of thickness 4 mm and above meet the proposed E.E.C. standard referred to below if uniformly toughened to have a central tensile stress in the range 55 $MN/m^2$ to 59 $MN/m^2$. However in the interest of reducing weight there is now a trend towards the use of glass thinner than 4 mm, in motor vehicles for example glass of thickness in the range 2.5 mm to 4 mm.

In the draft standard under discussion by the European Economic Community (EEC) it is required that the number of particles in any 5 cm×5 cm square traced on the fractured glass, excluding a 3 cm wide band around the edge of the glass sheet and a circular area of 7.5 cm radius around the point from which fracture is initiated, should be 50 at the minimum and 300 at the maximum.

The proposed E.E.C. standard also has the requirement that the fractured glass sheet shall not contain any elongated particles with jagged ends of more than 6 cm in length, such particles being referred to as "splines".

British Standard No. BS 5282 entitled "ROAD VEHICLE SAFETY GLASS" is less restrictive than the proposed E.E.C. standard in that it specifies for glass less than 4 mm in thickness a minimum particle count of 40 in a 5 cm×5 cm square may be permitted and the maximum permitted particle count in a 5 cm×5 cm square may be 400. The British Standard also basically prohibits the presence of splines of more than 6 cm in length in the fractured test glass.

It has been found difficult to toughen thinner glass sheets to meet the official fracture requirements, this difficulty being particularly evident in a size greater than about 1100 mm×500 mm this is about the size of the smallest vehicle rear window in current production. Many vehicle side windows are also of about this size or greater.

In U.S. Pat. No. 4,128,690 and assigned to the same assignee as the present application there is described and claimed a glass sheet for use as a side or rear window for a motor vehicle and of thickness in the range 2.5 mm to 3.5 mm having characteristics which have been discovered enable the sheet to meet at least the official fracture requirements laid down in British Standard No. BS 5282, the glass sheet being differentially quenched to produce in the glass sheet a distribution of regions of more highly toughened glass interspersed with regions of lesser toughened glass, the average central tensile stress in the glass sheet being in the range of from a maximum of 62 $MN/m^2$ for all glass thicknesses from 2.5 mm to 3.5 mm to a minimum of 56.5 $MN/m^2$ for 2.5 mm thick glass varying inversely with thickness down to a minimum of 53 $MN/m^2$ for 3.5 mm thick glass, and there being a distribution of medium toughened glass areas interspersed among said more highly toughened and said lesser toughened regions in the glass sheet and in which there are major and minor principal stresses acting in the plane of the glass sheet, the difference between said major and minor principal stresses in at least some of said medium toughened areas being at a maximum in the range 8 $MN/m^2$ to 25 $MN/m^2$, the major principal stresses in adjacent ones of such medium toughened areas being in substantially different directions, and the distance between the centers of such adjacent areas being in the range 15 mm to 30 mm, the number and location of such adjacent areas being sufficient that upon fracture there is an absence of splines of more than 6 cm in length in the glass sheet.

A glass sheet having the above characteristics was produced, as described in U.S. Pat. No. 4,128,690, by quenching a distribution of regions of the glass sheet at a maximum rate so that interspersed regions of the glass sheet are simultaneously quenched at a minimum rate, regulating said maximum quenching rate and the size and spacing of the regions of the glass sheet which are quenched at a maximum rate such that an average central tensile stress is produced in the glass sheet in the range of from a maximum of 62 $MN/m^2$ for all glass thicknesses from 2.5 mm to 3.5 mm to a minimum of 56.5 $MN/m^2$ for 2.5 mm thick glass varying inversely with thickness down to a minimum of 53 $MN/m^2$ for 3.5 mm thick glass, and such that there is produced in the glass sheet a distribution of medium toughened glass areas interspersed among said more highly toughened and said lesser toughened regions in the glass sheet and in which there are major and minor principal stresses acting in the plane of the glass sheet, the difference between said major and minor principal stresses in at least some of said medium toughened areas being at a maximum in the range 8 $MN/m^2$ to 25 $MN/m^2$, the major principal stresses in adjacent ones of such medium toughened areas being in substantially different directions, and the distance between the centres of such adjacent areas being in the range 15 mm to 30 mm, the number and location of such adjacent areas being sufficient that upon fracture there is an absence of splines of more than 6 cm in length in the glass sheet.

In carrying out the above method quenching was effected by directing quenching jets at the glass sheet, and imparting a vertical oscillation or a circular oscillation to the quenching jets to produce the required distribution of regions of the glass sheet quenched at a maximum rate. The quenching could also be effected by directing stationary quenching jets at the glass sheet to produce the required distribution of regions of the glass sheet quenched at a maximum rate.

Glass sheets for motor vehicle side windows in particular are often of irregular non-rectangular shape. Many side windows are for example of trapezoidal shape. The toughening of such sheets by conventional methods, particularly when the sheets are the thickness in the range 2.5 mm to 4 mm has produced a product which does not always satisfy the standards because of the production of splines in the fracture in localised areas of the sheet. This difficulty can arise even in the case of some small sized vehicle side windows because of their shape.

When the sheet is of trapezoidal shape for example the region of the sheet extending towards the narrowing, pointed end of the sheet is particularly prone to the production of splines when the glass sheet is fractured from a position at about the geometrical centre of the glass sheet.

It is a main object of the present invention to overcome this problem by modification of the stresses produced in the glass sheet during the toughening process in such a way as to produce a region of higher stress than the stress in the rest of the sheet and so avoid the production of splines in the fracture.

A further object of the invention is to adapt the new discovery to the production of a plurality of parallel extensive regions of higher stress in a glass sheet, for example a rear window in areas where the glass sheet when fractured would otherwise be prone to the production of splines.

SUMMARY

According to the invention there is provided a glass sheet for use as a side or rear window for a motor vehicle and of thickness in the range 2.5 mm to 4.0 mm which sheet is quenched to produce in the sheet an average central tensile stress in the range from a maximum of 62 MN/m$^2$ for all glass thicknesses from 2.5 mm to 4.0 mm to a minimum of 56.5 MN/m$^2$ for 2.5 mm thick glass varying inversely with thickness down to a minimum of 44.0 MN/m$^2$ for 4.0 mm thick glass, the glass sheet having at least one strip-shaped region of more highly toughened glass in which the central tensile stress is in the range from 2 MN/m$^2$ to 5 MN/m$^2$ greater than the average central tensile stress in the sheet, and in which region there are major and minor principal stresses acting in the plane of the glass sheet, the difference between said major and minor principal stresses in said region being in the range 5 MN/m$^2$ to 25 MN/m$^2$.

The invention has proved particularly successful for the special toughening of a glass sheet of trapezoidal shape for use as a motor vehicle side window. From this aspect the invention provides a glass sheet of trapezoidal shape having one said strip-shaped region adjacent the longer of the parallel sides of the sheet, which region so regulates fracture propagation in the converging region of the sheet that upon fracture the production of splines is avoided.

A single strip-shaped region may be provided when the region which is prone to the production of splines is relatively narrow. However the width of the strip-shaped region must be such that the glass still conforms within the strip-shaped region to the fracture requirement regarding minimum and maximum particle counts and the absence of splines of the standards described above.

It has been found when producing trapezoidal-shaped glass sheets, 3 mm thick, for motor vehicle side windows, that the strip-shaped region should preferably be less than 50 mm wide.

In order to provide the required modified stress pattern in regions of greater width than a single strip-shaped region of maximum partical width a plurality of parallel strip-shaped regions of more highly toughened glass are produced in the glass sheet. From this aspect the invention provides a glass sheet having a plurality of said strip-shaped regions of more highly toughened glass, said strip-shaped regions being parallel and spaced by regions of lesser toughened glass, and wherein the distance between the centre of each of said strip-shaped regions and the centre of the contiguous region of lesser toughened glass is in the range 15 mm to 50 mm and the distance between the centres of adjacent strip-shaped regions of more highly toughened glass is in the range 30 mm to 100 mm.

In the ultimate when it is found necessary to control the minimum and maximum particle counts and the production of splines over the whole area of the glass sheet, the plurality of strip-shaped regions extend over the whole area of the sheet.

The invention also comprehends a method of producing a glass sheet of thickness in the range 2.5 mm to 4.0 mm for use as a rear or side window for a motor vehicle, comprising advancing the glass sheet between flows of quenching gas to produce in the sheet an average central tensile stress in the range from a maximum of 62 MN/m$^2$ for all glass thicknesses from 2.5 cm to 4.0 mm to a minimum of 56.5 MN/m$^2$ for 2.5 mm thick glass varying inversely with thickness down to a minimum of 44.0 MN/m$^2$ for 4.0 mm thick glass, and directing at least one gas jet at the advancing glass to produce at least one strip-shaped region in the glass sheet of more highly toughened glass such that the central tensile stress in said strip-shaped region is in the range from 2 MN/m$^2$ to 5 MN/m$^2$ greater than the average central tensile stress in the sheet, and such that there are major and minor principal stresses in said strip-shaped region acting in the plane of the glass sheet, the difference between said major and minor principal stresses in said region being in the range 5 MN/m$^2$ to 25 MN/m$^2$.

The invention may be applied to a glass sheet which is being advanced horizontally either on a roller conveyor or on a gaseous support.

The invention also provides a method of producing a glass sheet of a thickness in the range 2.5 mm to 4.0 mm for use as a side window for a motor vehicle, comprising advancing a glass sheet of trapezoidal shape horizontally between flows of quenching gas with the parallel sides of the glass sheet lying in the direction of advance to produce in the sheet an average central tensile stress in the range from a maximum of 62 MN/m$^2$ for all glass thicknesses from 2.5 mm to 4.0 mm to a minimum of 56.5 MN/m$^2$ for 2.5 mm thick glass varying inversely with thickness down to a minimum of 44.0 MN/m$^2$ for 4.0 mm thick glass, and directing a gas jet towards at least one surface of the advancing glass sheet adjacent the longer of the parallel sides to produce a strip-shaped region of more highly toughened glass in the glass sheet adjacent said longer side such that the central tensile stress in said strip-shaped region is in the range from 2 MN/m$^2$ to 5 MN/m$^2$ greater than the average central tensile stress in the sheet, and such that there are major and minor principal stresses in said strip-shaped region acting in the plane of the glass sheet, the difference between said major and minor principal stresses in said region being in the range 5 MN/m² to 25 MN/m².

For producing a plurality of strip-shaped regions of more highly toughened glass, the invention further provides a method comprising advancing the glass sheet horizontally through a quenching station where the glass is quenched by flows of chilling air over both faces of the glass, directing towards at least one face of the glass gas jets which are spaced apart in at least one row transversely to the direction of advance of the glass, and regulating the speed of advance of the glass so that said one face of the glass is subjected to localised gas flows to produce a distribution of parallel regions of more highly toughened glass interspersed with regions of lesser toughened glass.

The method of the invention is particularly applicable to the treatment of a sheet of glass which is being advanced horizontally on a gaseous support said gas jet being directed towards the upper face of the sheet at the quenching station.

BRIEF DESCRIPTION OF THE DRAWINGS

In order that the invention may be more clearly understood some embodiments thereof will now be described, by way of example, with reference to the accompanying drawings, in which.

DESCRIPTION OF PREFERRED EMBODIMENTS

Figure 1:
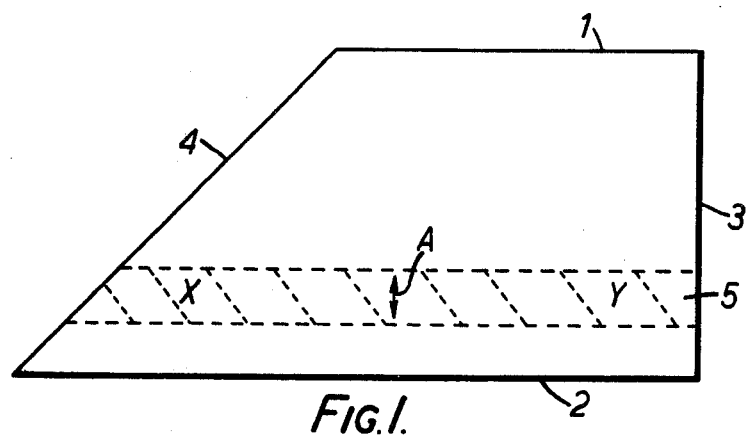
FIG. 1 illustrates a glass sheet of trapezoidal shape for a motor vehicle side window and indicates a strip-shaped region of higher stress

FIG. 1 illustrates a glass sheet, 3 mm thick for use as a motor vehicle side window. The sheet is of trapezoidal shape having two parallel sides 1 and 2. The trapezoidal shape of the sheet is further determined by a side 3 at right angles to the parallel sides 1 and 2 and a sloping side 4 leading from the shorter parallel side 1 to the longer parallel side 2.

In a particular example the length of the shorter parallel side 1 is 480 mm, the length of the longer parallel side 2 is 860 mm and the side 3 is 380 mm long.

The glass sheet is toughened in a manner which will be described so as to have a strip-shaped region 5 which is delineated in FIG. 1 by dotted lines, and which has a higher central tensile stress than the central tensile stress induced in the rest of the glass sheet. The width of the region 5 parallel to the side 3 of the sheet may be 38 mm to 50 mm. The region 5 is adjacent the longer side 2 of the parallel sides of the sheet and is spaced from the side 2 by a distance of from 50 mm to 75 mm.

The glass sheet is toughened by the use of quenching gas flows in the manner which will be described with reference to FIGS. 4 to 6 to produce central tensile stress in the main body of the glass 57 MN/m² and central tensile stress in the strip-shaped region 5 in the range 59 MN/m² to 62 MN/m², that is central tensile stress in the region 5 in the range from 2 MN/m² to 5 MN/m² greater than the central tensile stress in the main body of the glass.

In the strip-shaped region 5 there are unequal major and minor principal stresses acting in the plane of the glass sheet, with the major principal tensile stress acting across the strip 5 as indicated by the arrow A, and the difference between the major and minor stresses being in the range 12 MN/m² to 16 MN/m².

The region 5 extends over two areas of the glass sheet indicated by the letters X and Y where, but for the production of the region 5, the glass sheets have been found to be particularly prone to the production of splines when the sheet fractures.

The provision of the strip of more highly toughened glass which has a central tensile stress from 2 MN/m² to 5 MN/m² greater than the central tensile stress in the main body of the glass with the difference between the major and minor principal stresses in the strip in the range of 12 MN/m² to 16 MN/m² ensures that splines are not present in this particular glass when fractured, particularly in the region X where the glass narrows towards its longer parallel side.

Generally according to the invention the average central tensile stress in the sheet should be in the range from a maximum of 62 MN/m² for all glass thicknesses from 2.5 mm to 4.0 mm to a minimum of 56.5 MN/m² for glass 2.5 mm thick varying inversely with thickness down to a minimum of 44.0 MN/m² for glass 4 mm thick.

Also according to the invention the central tensile stress in the strip shaped region should be in the range from 2 MN/m² to 5 MN/m² greater than the average central tensile stress in the sheet and the difference between the major and minor principal stresses in said region should be in the range 5 MN/m² to 25 MN/m².

Figure 2:
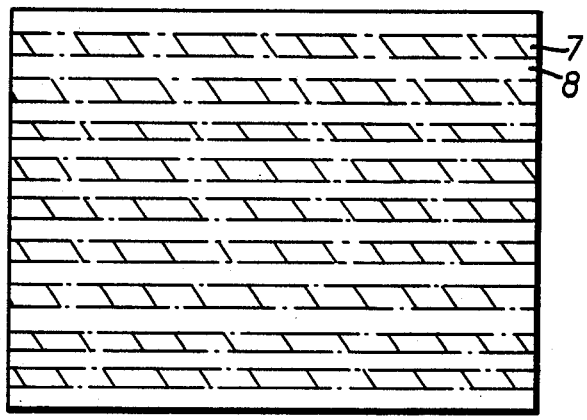
FIG. 2 illustrates a glass sheet of rectangular shape toughened with a plurality of strip-shaped regions of higher stress by the method of the invention

In some instances it is desired that the modified toughening stresses should cover regions of greater width than can be covered by a single strip-shaped region of maximum practical width and a plurality of strip-shaped regions of higher toughening stress are produced in the glass sheet. In the ultimate where the production of splines and the minimum and maximum particle counts in the fracture anywhere over the whole of the glass sheet has to be controlled, parallel strip-shaped regions may extend over the whole glass surface in the manner illustrated in FIGS. 2 and 3. FIG. 2 shows the production of such parallel regions, indicated at 7, in a rectangular glass sheet but such a toughening pattern may be produced in any glass sheet for a motor vehicle side or rear window which is of an irregular non-rectangular shape.

Figure 3:
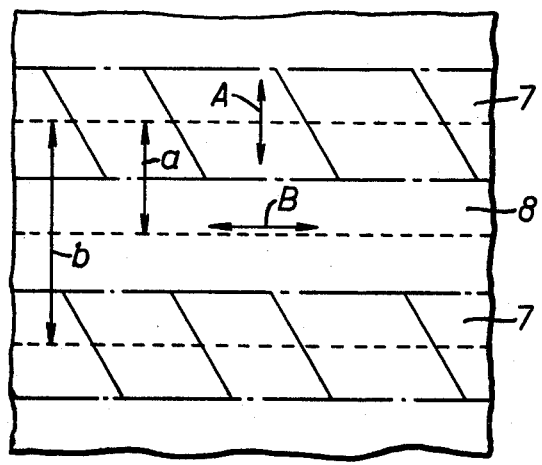
FIG. 3 is an enlarged view of part of the glass sheet of FIG. 2

The test glass illustrated in FIGS. 2 and 3 was a rectangular glass sheet 4 mm thick and of outer dimensions 450 mm to 600 mm. Nine parallel strip-shaped regions 7 of higher central tensile stress were produced in the glass sheet. Each of the strip-shaped regions is 25 mm wide and the regions 7 are spaced apart by regions 8 of lesser toughened glass which are 25 mm wide.

As shown in FIG. 3 the distance a between the centre of each of the regions 7 of more highly toughened glass and the centre of a contiguous region 8 of lesser toughened glass is also 25 mm. This distance a may be in the range 15 mm to 50 mm.

While the distance b between the centres of adjacent regions 7 is 50 mm in the embodiment described, this distance b may be in the range 30 mm to 100 mm. In the higher toughened regions 7 the major principal tensile stress extends across the strip-shaped region as indicated by the arrow A. In the lesser toughened regions 8 the major principal tensile stress extends along the region as indicated by the arrow B. The major principal stresses in contiguous regions are therefore in different directions and the distance between the centres of contiguous regions 7 and 8 where the major principal stresses which are in different directions are a maximum, is in the range 15 mm to 50 mm.

The average central tensile stress of the glass sheet is averaged along any line extending parallel to the shorter sides of the sheet from one of the longer sides to the other longer side. Values of average central tensile stress and differences between major and minor principal stresses for four sheets of the kind illustrated in FIGS. 2 and 3 are set out in the following Table:

| Average Central Tensile Stress $MN/m^2$ | Difference Between Major and Minor Principal Stresses $MN/m^2$ |
| --- | --- |
| 47.7 to 51 | 6.75 |
| 47.2 to 51 | 5.25 |
| 49.9 to 52.2 | 6.0 |
| 44.4 to 46.8 | 5.25 |

The toughening pattern indicated in FIG. 2 ensures that no splines are produced in the glass sheet when fractured particularly from its centre by point impact which completely satisfies the E.E.C. and British Standards. The minimum and maximum particle count requirements of such standards are also met in the fractured sheet.

Figure 4:
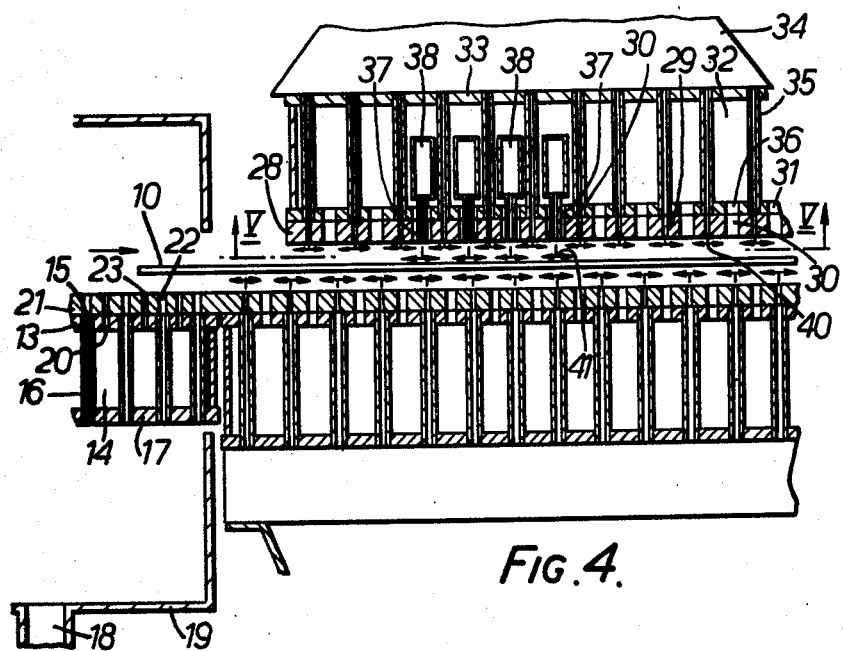
FIG. 4 is a sectional elevation of a quenching station for producing the toughened glass sheet of FIGS. 2 and 3
Figure 5:
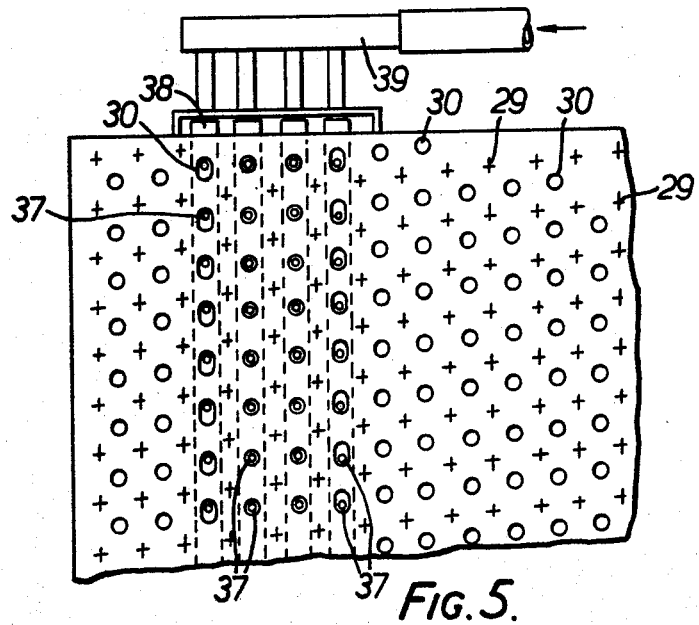
FIG. 5 is an underneath view of the upper part of the quenching station on line V—V of FIG. 4
Figure 6:
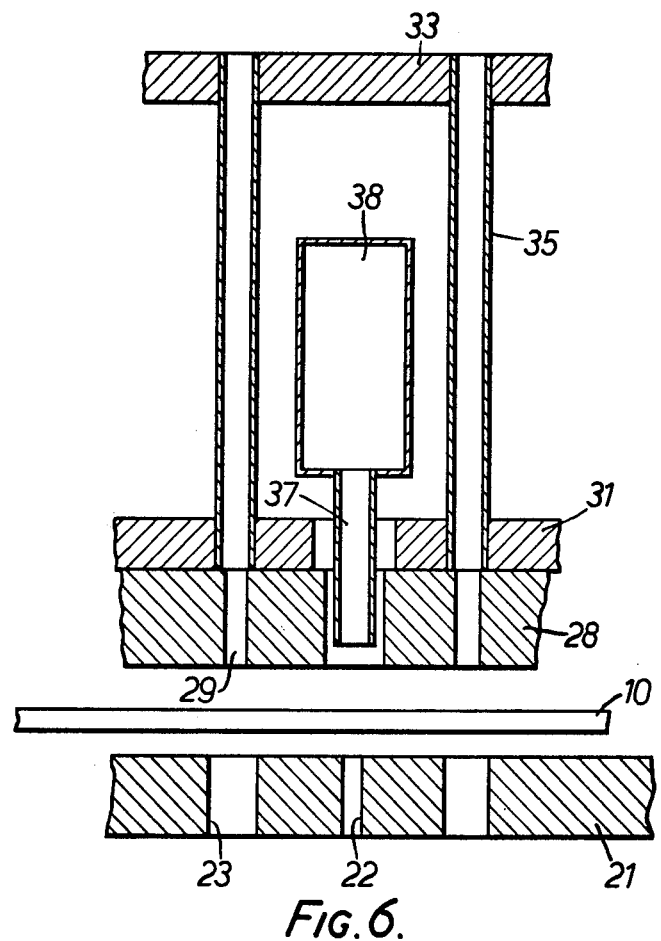
FIG. 6 is a detailed view of part of the quenching station of FIGS. 4 and 5.

Apparatus as illustrated in FIGS. 4 to 6 is employed for toughening the glass sheets. The flat sheets of glass which are cut to the required shapes for use as a side or rear window of a vehicle are fed in sequence onto asbestos covered rollers and are conveyed on those rollers through the first part of a heating furnace and are then conveyed through the remaining length of the furnace on a base bed structure which generates a gaseous support for the glass sheets while they are heated. The bed structure comprises a base plate 13 which is a flat plate of heat-resistant stainless steel and which forms the roof of an exhaust chamber indicated at 14. The plate 13 is uniformly apertured for the passage of hot gases from outlet apertures 15. Each of the apertures 15 for the passage of hot gases upwardly through the base plate 13 is defined by the bore of a supply tube 16 which is fitted into a hole in the base plate. The tops of the tubes 16 are flush with the top surface of the base plate 13 and the tubes 16 extend downwardly from the base plate 13 and are located at their lower ends in holes in a floor 17 of the exhaust chamber 14. Hot gases are supplied through ducts 18 to plenum chambers 19. As shown in FIG. 4 the floor 17 of the exhaust chamber 14 forms the roof of one of the plenum chambers 19.

The base plate 13 is also formed with equally interspersed exhaust openings 20 communicating with the exhaust chamber 14. Outlet apertures, not shown, in the walls of the exhaust chamber 14 allow gases to escape to atmosphere or for collection and recirculation.

The upper face of the base plate 13 is an accurately flat surface formed to receive in intimate engagement the lower face of a series of removable blocks 21 which are machined from heat-resistant stainless steel with their lower faces machined flat so that they can be slid into the apparatus from one side into gas-tight engagement with the upper surface of the base plate 13. The blocks 21 each have gas escape apertures 22 communicating with the outlet apertures 15 and gas exhaust apertures 23 communicating with the exhaust openings 20. Hot gases supplied through the ducts 18 into the plenum chambers 19 proceed upwardly through the tubes 16 and the apertures 22 in the block 21 and escape and expand above the upper surface of the block 21 to create a gaseous support under the advancing glass sheets, one of which is indicated at 10.

Gas is continually released from the apertures 22 into the gaseous support for each glass sheet and simultaneously gas excapes from the gaseous support through the exhaust apertures 23 into the exhaust chamber 14 and thence to the outlet apertures.

The upper surfaces of the blocks 21 are transversely tilted so as to lie at a small angle to the horizontal, for example 5°. As soon as each glass sheet 10 becomes completely and uniformly supported on the gaseous support it tends to slide down the transverse incline until it is in engagement with rotating discs, not shown, mounted alongside the blocks 21 on vertical spindles which in known manner, extend upwardly from drive motors outside the furnace which motors drive the discs at a controlled speed commensurate with the rate of advance of the glass sheets 10 on to the gaseous support by the rollers.

The glass sheets are placed on the conveyor rollers end-to-end so that a succession of flat glass sheets 10 are advanced into the furnace by the driving action of the conveyor rollers, and are then conveyed over the blocks 21 on the gaseous support created by the presence of the sheets over the blocks. The glass sheets are further heated by the hot gases of the support and by radiant heat from heaters mounted in the roof structure over the path of travel of the glass sheets.

The edge discs maintain the registration of the glass sheets in the furnace and also provide drive to cause the forward movement of the sheets. However some of the discs may be free running and act as rotatable guides.

The construction of the last section only of the furnace is illustrated in FIG. 4, and by the time each glass sheet 10 reaches the end of the furnace the glass is at a temperature of the order of 630° C. to 670° C. for soda-lime-silica glass suitable for the thermal toughening of the glass by subjecting the glass to quenching gas flows, usually flows of air at ambient temperature.

The advance of the hot glass sheets 10 continues to a quenching station which is illustrated in FIGS. 4 to 6. At the quenching station the glass sheets are supported on a gaseous support generated above a bed of identical construction to the bed in the furnace except that the bed is supplied with chilling air at ambeint temperature. The presence of each glass sheet advancing into the quenching station from the furnace generates a gaseous cushion between the sheet and the upper surface of the bed which provides both the required support for the sheet and a flow of chilling air against the bottom surface of the glass sheet. This advance of the glass sheet into the quenching station is by means of rotating discs, not shown.

In the quenching section there is a generalised flow of quenching gas contacting the upper surface of the glass sheet which gas flow has a substantially identical chilling effect on the upper surface of the glass as the chilling effect of the lower surface by the gaseous support. The gas flows on the upper surface are generated from an upper gas supply and exhaust equipment of identical construction to the base bed supplying gas to and exhausting gas from the gaseous support.

As shown in FIG. 4 the upper part of the quenching station comprises a plate 28 of asbestos-based, heat-resistant material which has gas supply apertures 29 and gas exhaust apertures 30. These apertures are also shown in FIG. 5. The plate 28 is fixed to an apertured base plate 31 of a gas exhaust chamber 32. The matching surfaces of the plates 28 and 31 are machined flat so as to be gas tight. The roof of the exhaust chamber 32 is a plate 33 which also forms the base of a plenum chamber 34 to which chilling air at ambient temperature is supplied. The chilling air passes through apertures in the plate 33 and is conducted down tubes 35 extending through the exhaust chamber 32 the lower ends of which tubes are fixed in the base plate 31 of the exhaust chamber and communicate with the gas supply apertures 29 in the plate 28. The gas exhaust apertures 30 in the plate 28 are aligned with exhaust apertures 36 in the plate 31 so that gas can escape from above the glass sheet into the exhaust chamber 32 whose walls have apertures so that the exhaust gases can be collected and recirculated.

The hot glass sheet is subjected to the generalised quenching gas flows at the quenching station as it is advanced into the quenching station, and during its advance it is also subjected to one or more localised gas flows to produce in the glass the higher toughened strip-shaped region 5 of FIG. 1 or the parallel strip-shaped regions 7 of FIGS. 2 and 3. The apparatus of FIGS. 4 to 6 is particularly adapted to produce the parallel strip-shaped regions, but can be regulated, as will be described to produce one region 5 only.

When passing through the quenching station illustrated in FIGS. 4 to 6, the upper surface of the glass sheet 10 is subjected to a rectangular array of gas jets 40 which are spaced apart in rows transversely of the direction of advance of the glass with rows spaced apart in the direction of advance. The distribution of the gas supply apertures and gas support apertures in the plates 21 and 28 is slightly inclined to the direction of advance of the glass, as illustrated in FIG. 5. The rectangular array of gas jets which are in line with the advance of the glass is provided by an array of gas supply nozzles 37 which are connected in rows to ducts 38 located in the exhaust chamber 32. The nozzles 37 extend downwardly through specially enlarged gas exhaust apertures 30 in the plate 28.

One end of each of the ducts is connected to an air supply manifold 39 located outside the exhaust chamber alongside the quenching station.

In the embodiment illustrated there are four rows of nozzles 37 spaced apart at the same pitch as the gas exhaust apertures 30 in the direction of advance of the glass sheet. In FIG. 4 the quenching air flows supplied from the gas release apertures 29 are illustrated by the arrows 40 and the localised gas jets directed at the upper surface of the glass are illustrated by the arrows 41. The mounting of the ducts 38 with their nozzles 37 is illustrated in more detail in FIG. 6. The air supply to the manifold 39 is switched on when the glass sheet is passing beneath the nozzles 37, and the manifold 39 is connected through a pressure regulator to a solenoid operated spool valve of conventional design.

In one example of operation the compressed air supply switched to manifold 39 is at 690 kPa. The diameter of the bore of each of the nozzles 37 is 4.8 mm and the nozzle spacing is at 50 mm square pitch. The spacing of the ends of the nozzles from the upper surface of the glass supported on the gas cushion at the quenching station is 6 to 12 mm. As the glass sheet advances through the quenching station the gas flows through the apertures 22 and 29 produce the lesser toughened regions 8, while the parallel strip-shaped regions 7 of more highly toughened glass are produced by the supplementary action of the gas jets 41 on the upper surface of the glass. The effect of each line of gas jets lying in the direction of advance of the glass is cumulative and the glass sheet emerging from the quenching station has the required stress pattern described above with reference to FIGS. 2 and 3.

For some applications one transverse row of gas jets may be sufficient supplied by one row of nozzles 37 connected to a simple supply manifold 39.

When producing a single strip-shaped region 5 of more highly toughened glass as in the trapezoidal glass sheet of FIG. 1, the sheet is oriented with its parallel sides lying in the direction of advance and one nozzle 37, or a line of nozzles 37 spaced apart in the direction of advance are provided to produce the single region 7 either by a strong quench from the single nozzle or by the cumulative effect of the line of nozzles as the sheet passes through the quenching station. The single nozzles 37 or the lines of nozzles are so spaced from the driving discs which are engaged by the longer parallel side 2 of the sheet as to ensure the desired spacing of the region 5 from the side 2 of the sheet.

Figure 7:
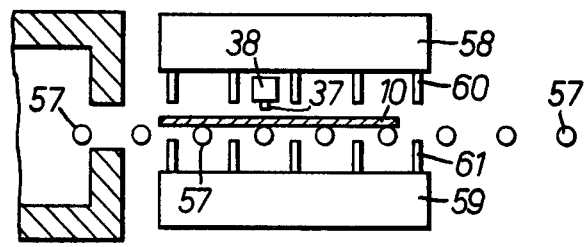
FIG. 7 illustrates the toughening of a glass sheet by the method of the invention while the sheet is supported on a roller conveyor.

FIG. 7 illustrates the toughening of a glass sheet which is being advanced on a roller conveyor comprising a series of horizontal rollers 57.

The conveyor carries the glass sheet through a heating furnace indicated at 58 to a quenching station where the rollers carry the glass sheet between upper and lower blowing boxes 58 and 59. The box 58 has an array of blowing nozzles 60 which point downwardly towards the roller conveyor so as to direct generalised quenching gas flows on to the upper surface of the glass sheet 10. The nozzles 60 are arranged at a slight angle to the direction of advance of the glass sheet in the same way as the supply and exhaust apertures in FIG. 5.

Similarly the lower blowing box 59 has upwardly projecting blowing nozzles 61 which are directed through the gaps between the rollers 57 and are also arranged at a slight angle to the direction of advance of the glass sheet.

The flows of quenching gas from the nozzles 60 and 61 supplemented by one or more localised gas flows from a single gas supply nozzle 37 or a row of gas supply nozzles 37 connected to a duct 38 and mounted between adjacent rows of upper nozzles 60. The nozzle or nozzles 37 direct one or more localised gas jets as required at the upper surface of the glass in the same way as described with reference to FIGS. 4 to 6 so that the glass sheet emerging from the quenching station on the roller conveyor has the required strip-shaped region or regions of more highly toughened glass. Alternatively or in addition localised gas jets may be directed against the lower surface of the glass sheet by gas supply nozzles 37 directed upwardly through the gaps between the rollers 57. When localised gas jets are directed against both the upper and lower surface of the glass sheets these are arranged to act on opposite regions of the two surfaces of the sheets.

I claim:

1. A glass sheet for use as a side or rear window for a motor vehicle and of thickness in the range 2.5 mm to 4.0 mm which sheet is quenched to toughen the sheet to a relatively high degree by producing in the sheet an average central tensile stress in the range from a maximum of 62 MN/m$^2$ for all glass thickness from 2.5 mm to 4.0 mm to a minimum of 56.5 MN/m$^2$ for 2.4 mm thick glass varying inversely with thickness down to a minimum of 44.0 MN/m$^2$ for 4.0 mm thick glass, the glass sheet having at least one strip-shaped region of more highly toughened glass in which the central tensile stress is in the range from 2 MN/m$^2$ to 5 MN/m$^2$ greater than the average central tensile stress in the relatively highly toughened sheet, and in which region there are major and minor principal stresses acting in the plane of the glass sheet, the difference between said major and minor principal stresses in said region being in the range 5 MN/m$^2$ to 25 MN/m$^2$, the number and location of said strip-shaped regions of more highly toughened glass being sufficient that upon fracture there is an absence of splines of more than 6 cm in length in the glass sheet.

2. A glass sheet according to claim 1, wherein the glass sheet has a plurality of said strip-shaped regions of more highly toughened glass, said strip-shaped regions being parallel and spaced by regions of lesser toughened glass, and wherein the distance between the center of each of said strip-shaped regions and the center of the contiguous region of lesser toughened glass is in the range 15 mm to 50 mm and the distance between the centers of adjacent strip-shaped regions of more highly toughened glass is in the range 30 mm to 100 mm.

3. A glass sheet according to claim 2, wherein the plurality of strip-shaped regions extend over the whole area of the glass sheet.

4. A glass sheet for use as a side window for a motor vehicle and of a thickness in the range 2.5 mm to 4.0 mm which sheet is quenched to toughen the sheet to a relatively high degree by producing in the sheet an average central tensile stress in the range from a maximum of 62 MN/m$^2$ for all glass thicknesses from 2.45 mm to 4.0 mm to a minimum of 56.5 MN/m$^2$ for 2.5 mm thick glass varying inversely with thickness down to a minimum of 44.0 MN/m$^2$ for 4.0 mm thick glass, the glass sheet being trapezoidal in shape and having one strip-shaped region of more highly toughened glass adjacent the longer of the parallel sides of the sheet, the central tensile stress in said strip-shaped region being in the range from 2 MN/m$^2$ to 5 MN/m$^2$ greater than the average central tensile stress in the relatively highly toughened sheet, and in which region there are major and minor principal stresses acting in the plane of the glass sheet, the difference between said major and minor principal stresses in said region being in the range 5 MN/m$^2$ to 25 MN/m$^2$, the area and location of said strip-shaped region of more highly toughened glass being such that upon fracture there is an absence of splines of more than 6 cm in length in the glass sheet.

5. A glass sheet according to claim 4, wherein the glass sheet has a thickness of 3 mm and the width of said strip-shaped region in the direction perpendicular to the parallel sides of the glass sheet is less than 50 mm.

* * * * *